United States Patent [19]

Pelrine et al.

[11] 4,363,717

[45] Dec. 14, 1982

[54] CONVERSION OF HEAVY HYDROCARBON OILS

[75] Inventors: Bruce P. Pelrine, Trenton; Nai Y. Chen, Titusville, both of N.J.; Tsoung Y. Yan, Philadelphia, Pa.

[73] Assignee: Mobil Oil Corporation, New York, N.Y.

[21] Appl. No.: 225,284

[22] Filed: Jan. 15, 1981

[51] Int. Cl.³ .................... C10G 11/08; C10G 47/08; C10G 47/32

[52] U.S. Cl. ........................ 208/108; 208/56; 208/116; 208/117; 208/134; 208/209; 208/251 R; 208/254 R; 208/309

[58] Field of Search ............. 208/108, 116, 117, 86, 208/96, 309, 254 R, 251 R, 254 H, 251 H, 134, 11 LE

[56] References Cited

U.S. PATENT DOCUMENTS

| | | | |
|---|---|---|---|
| 2,859,174 | 11/1958 | Adams et al. | 208/116 X |
| 3,364,151 | 1/1968 | Disegna et al. | 208/116 X |
| 3,507,777 | 4/1970 | Hemminger | 208/86 |
| 3,511,774 | 5/1970 | Long et al. | 208/251 R |
| 3,948,755 | 4/1976 | McCollum et al. | 208/11 LE |
| 3,969,196 | 7/1976 | Zosel | 208/308 X |
| 4,201,660 | 5/1980 | Zosel | 208/86 |
| 4,290,880 | 9/1981 | Leonard | 208/309 |

OTHER PUBLICATIONS

Chem. Abstracts 63 11045b (1965) for Belg. 646,641 equivalent to Brit. Pat. No. 57,911 and U.S. Pat. No. 3,969,196.

Chem. Abstracts 64 17339c (1965) for Neth. Appl. No. 65/10,047 equiv. to Brit. Pat. No. 1,111,422.

Primary Examiner—Delbert E. Gantz
Assistant Examiner—G. E. Schmitkons
Attorney, Agent, or Firm—Charles A. Huggett; Michael G. Gilman; Charles J. Speciale

[57] ABSTRACT

This invention provides a process for upgrading a heavy hydrocarbon oil to motor fuel products.

The heavy hydrocarbon oil is admixed with a metal halide catalyst and a solvent component under supercritical conditions to form (1) a dense-gas solvent phase which contains refined hydrocarbon crackate, and which is substantially free of metal halide catalyst content; and (2) a residual asphaltic phase.

28 Claims, 1 Drawing Figure

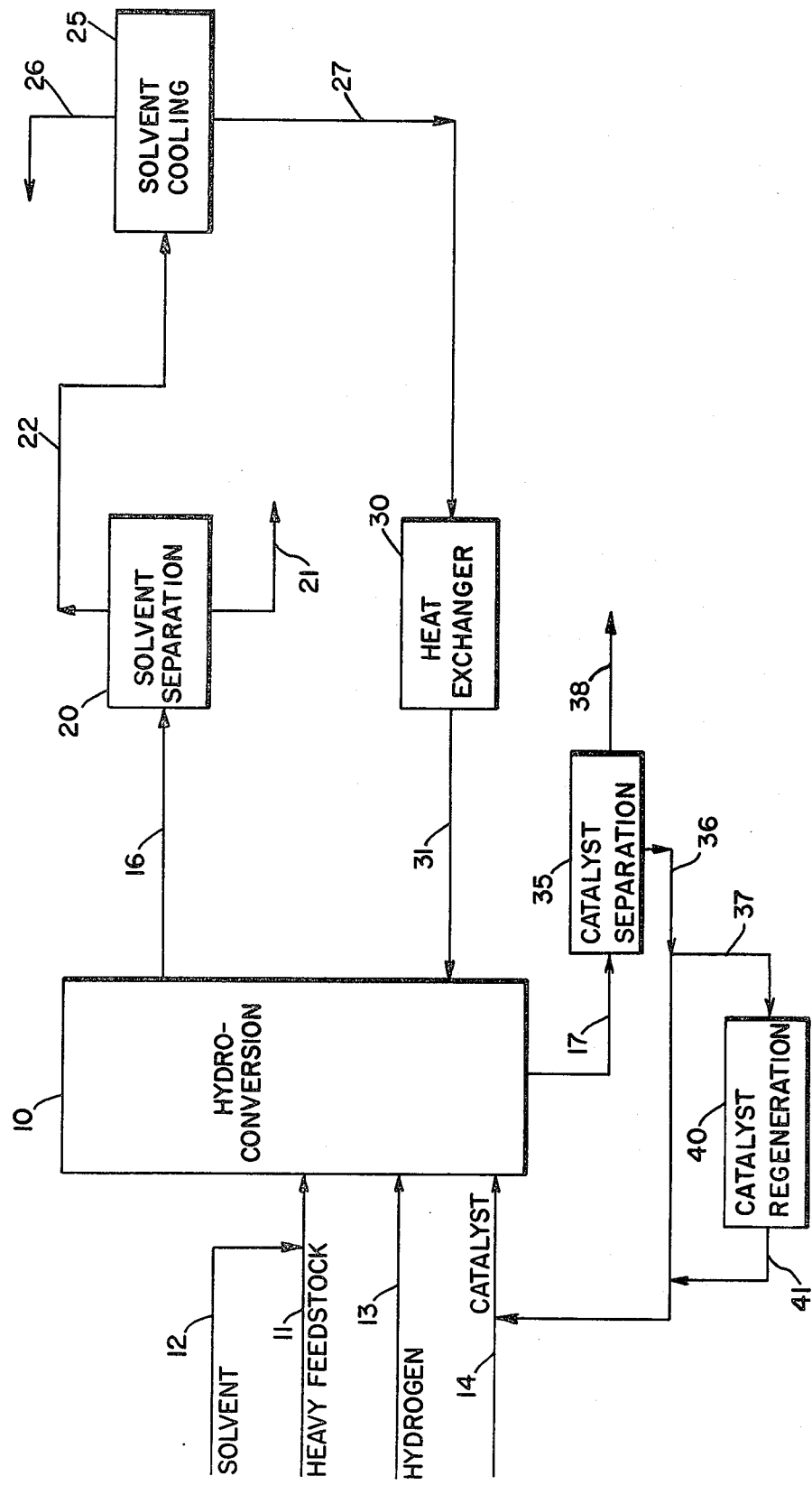

CONVERSION OF HEAVY HYDROCARBON OILS

BACKGROUND OF THE INVENTION

Residual petroleum oil fractions produced by atmospheric or vacuum distillation of crude petroleum are characterized by a relatively high metals, sulfur and nitrogen content. This occurs because substantially all of the contaminants present in the original crude remain in the residual fraction. Principal metal contaminants are nickel and vanadium, with iron and small amounts of copper sometimes present.

The high metals content of the residual fractions generally preclude their effective use as chargestocks for subsequent catalytic processing such as catalytic cracking and hydrocracking, because the metal contaminants deposit on the special catalysts for these processes and cause the formation of inordinate amounts of coke, dry gas and hydrogen.

It is current practice to upgrade certain residual fractions by a pyrolitic operation known as coking. In this operation the residuum is destructively distilled to produce distillates of low metals content and leave behind a solid coke fraction that contains most of the metals. Coking is typically carried out in a reactor or drum operated at about 800°–1100° F. temperature and a pressure of 1–10 atmospheres.

Certain residual fractions are currently subjected to visbreaking, which is a heat treatment of milder conditions than used in coking, in order to reduce their viscosity and make them more suitable as fuels. Excessive sulfur content sometimes limits the value of the product.

Presently, catalytic cracking is generally accomplished by utilizing hydrocarbon chargestocks lighter than residual fractions which usually have an API gravity less than 20. Typical cracking chargestocks are coker and/or crude unit gas oils, vacuum tower overhead, and the like, the feedstock having an API gravity from about 15 to about 45. Since these cracking chargestocks are distillates, they do not contain significant proportions of the large molecules in which the metals are concentrated. Such cracking is commonly carried out in a reactor operated at a temperature of about 800°–1500° F., a pressure of about 1–5 atmospheres, and a space velocity of about 1–1000 WHSV.

Metals and sulfur contaminants present similar problems with regard to hydrocracking operations which are typically carried out on chargestocks even lighter than those charged to a cracking unit. Hydrocracking catalyst is so sensitive to metals poisoning that a preliminary or first stage is often utilized for trace metals removal. Typical hydrocracking reactor conditions consist of a temperature of 400°–1000° F. and a pressure of 1000–3500 psig.

The economic and environmental factors relating to upgrading of petroleum residual oils and other heavy hydrocarbon feedstocks have encouraged efforts to provide improved processing technology, as exemplified by the disclosures of various United States patents.

U.S. Pat. No. 3,730,879 describes a two-bed catalyst arrangement for hydrodesulfurization of crude oil. In the first bed at least 50 percent of the total pore volume of the catalyst has pores with diameters in the 50—100 Angstrom range, and in the second bed less than 45 percent of the total pore volume of the catalyst has pores with diameters in the 50–100 Angstrom range.

U.S. Pat. No. 3,905,893 discloses a hydrodesulfurization and demetalation process which involves an initial stage having relatively high hydrogen pressure in the presence of a catalyst comprising a relatively low proportion of catalytically active hydrogenation metals. The process employs a final stage in series having a relatively lower hydrogen pressure and a catalyst comprising a relatively higher proportion of hydrogenation metals.

U.S. Pat. No. 3,901,792 describes a multi-zone method for demetalizing and desulfurizing crude oil or atmospheric residual oil. An initial contact stage contains a material having extensive macroporosity and is operated as an ebullated bed under optimum demetalation conditions. This is followed by a removal of effluent vapors and a further ebullated bed contact of the liquid with a highly active hydrodesulfurization catalyst.

U.S. Pat. No. 3,964,995 discloses a two-stage hydrodesulfurization process for a 65–80 percent desulfurization of a high metals content residuum. The first stage contains porous alumina contact material activated with at least one promoter oxide. The second stage contains a highly active desulfurization catalyst of limited porosity.

U.S. Pat. No. 3,985,643 describes an improved process for desulfurization of metals and sulfur-containing petroleum oils, which involves passing a petroleum oil through a bed of substantially aged desulfurization catalyst at a temperature not less than 770° F. preceeding conventional hydrodesulfurization treatment.

U.S. Pat. No. 4,016,067 is concerned with removing metal and sulfur contaminants from petroleum oil by catalytic contact with a dual bed system. The oil is first contacted with a catalyst comprising a Group VIB metal or iron group metal oxide on an aluminum support that contains delta or theta phase alumina, the catalyst having at least 60 percent of its pore volume in pores of 100–200 Angstroms diameter, at least about .5 percent of its pore volume in pores having a diameter greater than 500 Angstroms, and a surface area up to about 110 $m^2/g$. The oil is then contacted with a second catalyst of the high surface area cobalt-molybdenum type.

Other U.S. patents which relate to demetalation, desulfurization and denitrification of heavy hydrocarbon oils include U.S. Pat. Nos. 2,761,816; 2,909,476; 2,921,022; 3,094,480; 3,594,312; 3,663,434; 3,696,027; 2,775,303; 3,876,530; 3,882,049; 3,897,329; and the like.

Another type of development involves the upgrading of heavy hydrocarbon oils by procedures in which at least a portion of the heavy constituents and coke precursors are converted to lower boiling hydrocarbon products, while simultaneously the concentrations of sulfur, nitrogen and metallic contaminants are reduced.

U.S. Pat. No. 4,051,015 describes a method for converting a heavy hydrocarbon oil by treatment with hydrogen in the presence of a particulate acidic copper chloride catalyst.

Other U.S. patents which relate to simultaneous decontamination and conversion of heavy hydrocarbon oils include U.S. Pat. Nos. 3,960,708; 3,989,618; 4,076,613; 4,087,348; 4,087,349; and the like, and references cited therein.

There is continuing research and development effort to improve the efficiency of processing means for upgrading of heavy hydrocarbon feedstocks.

Accordingly, it is an object of this invention to provide an improved catalytic process for reducing the metals, sulfur and nitrogen content of heavy hydrocarbon oils.

It is another object of this invention to provide a process for reducing the Conradson Carbon Residue Content of a heavy hydrocarbon oil by more than about 70 percent.

It is a further object of this invention to provide an improved process for simultaneously refining and converting a heavy hydrocarbon oil into motor fuel boiling range products in the presence of a metal halide catalyst.

Other objects and advantages of the present invention shall become apparent from the accompanying description and flow diagram.

DESCRIPTION OF THE INVENTION

One or more objects of the present invention are accomplished by the provision of a process for conversion of a heavy hydrocarbon oil which comprises (1) contacting a heavy hydrocarbon oil with a metal halide catalyst in admixture with a solvent component under supercritical conditions to form a dense-gas solvent extract phase and a residual asphaltic phase; (2) separating the phases to provide a dense-gas solvent extract phase which is substantially free of metal halide catalyst content; and (3) fractionating the dense-gas solvent extract phase to remove the solvent and yield a refined hydrocarbon crackate fraction.

The term "heavy hydrocarbon oil" is meant to include petroleum oil residua, shale oil, coal-derived hydrocarbons and tar sand bitumen feedstocks, in which mixtures at least 75 weight percent of the constituents have a boiling point above about 650° F.

Typically, a heavy hydrocarbon oil suitable for upgrading in accordance with the present invention has a sulfur content of at least 3 weight percent, a metals content of at least 80 ppm, and a Conradson Carbon Residue content of at least 10 weight percent.

The metal halide catalyst is selected from a class of metal chlorides, bromides and iodides which exhibit catalytic properties adapted for demetalation, desulfurization, denitrification and cracking of heavy hydrocarbon oil feedstock under the invention process conditions. Suitable metal catalysts include aluminum chloride, zinc chloride, gallium trichloride, stannic bromide, stannous iodide, zirconium tetrachloride, titanium tetrabromide, cuprous chloride, cuprous bromide, cuprous iodide, cupric chloride, and the like, and other metal halides described in technical literature such as U.S. Pat. No. 3,668,109.

The metal halide catalyst is employed in a quantity between about 0.5–30 weight percent based on the weight of heavy hydrocarbon oil feedstock which is charged to the step(1) conversion zone. The metal halide catalyst preferably is dispersed in the hydrocarbon stream in the form of finely divided particles.

In one process embodiment, stirring is employed to maintain the metal halide catalyst particles in a suspended state in the heavy hydrocarbon oil reaction medium which is contained in the lower portion of the step(1) conversion zone. Depending on the particular catalyst involved and the temperature employed in step(1), in some cases the catalyst can be in a liquid rather than a solid state.

An important aspect of the present invention process is the presence of a solvent component in the step(1) conversion zone, and the concomitant formation of a dense-gas solvent extract phase under supercritical conditions of temperature and pressure. The dense-gas solvent extract phase is contained in the upper portion of the step(1) conversion zone.

It is essential that the solvent component is present in a sufficient quantity to achieve an efficient and selective extraction of conversion hydrocarbon constituents, e.g., those having a $C_5$ to 450° F. motor fuel boiling range. A typical weight ratio of solvent component to heavy oil feedstock in the step(1) conversion zone will be in the range between about 1—10:1.

The solvent component may comprise either a single constituent of a mixture of constituents. The solvent component preferably exhibits a dense-gas critical temperature limit in the range between about 300°–700° F.

With reference to the solvent component, the term "supercritical conditions" as relating to the step(1) conversion zone means that the solvent is in a dense-gas state above its critical temperature. When a dense-gas solvent is at a temperature above its critical temperature, it cannot be liquefied by the application of any degree of increased pressure.

The advantage of dense-gas solvent extraction is the ability of compressed gas under supercritical conditions to solvate and dissolve liquid and solid organic materials. The solvent effect of compressed gases was first reported by Hannay and Hogarth [J. Proc. Roy. Soc., London, Series A, 29, 324 (1879)]. In "Liquid Fuels And Chemical Feedstocks From Coal By Supercritical Gas Extraction", the state of the art relative to supercritical gas extraction is reviewed [Ind. Eng. Chem. Prod. Res. Dev., 16, No. 3 (1977)].

The basic principles of dense fluid extraction are outlined in the monograph "The Principles Of Gas Extraction" by P. Paul and W. Wise (published by Mills and Boon Limited, London, 1971).

In the Background Of The Invention section of U.S. Pat. No. 3,948,755, the principles of dense fluid extraction are summarized in connection with the described process for recovering and upgrading hydrocarbons from oil shale and tar sands.

In principle, dense-gas extraction depends on the changes in the properties of a gas due to changes in the pressure. At temperatures below its critical temperature, the density of a gas varies in step functional fashion with changes in the pressure. Such sharp transitions in the density are associated with vapor-liquid transitions. At temperatures above the critical temperature of a gas, the density of the gas increases almost linearly with pressure as required by the Ideal Gas Law, although deviations from linearity are noticeable at higher pressures. Such deviations are more marked as the temperature of the gas is nearer, but still above, its critical temperature.

At a given pressure and at a temperature above the critical temperature of a compressed gas, the solvent power of the compressed gas should be greater the lower the temperature; and at a given temperature above the critical temperature of the compressed gas, the solvent power of the compressed fluid should be greater the higher the pressure.

The basis of separations by dense-gas extraction at elevated temperatures is that a substrate is brought into contact with a dense-gas solvent phase at an elevated temperature and material from the substrate is dissolved in the dense-gas phase. Then the dense-gas containing this dissolved material is isolated, and finally the isolated dense-gas is decompressed to a level where the solvent power of the fluid is minimized and the dissolved material is separated as a solid or liquid.

Some general conclusions based on empirical correlations have been drawn regarding the conditions for achieving high solubility of substrates in dense-gas phases. Thus, the solvent effect of a dense-gas depends on the physical properties of the solvent and of the substrate. This suggests that gases of different chemical nature but similar physical properties would behave similarly as dense-gas solvents. For example, it has been found that the solvent power of compressed ethylene and carbon dioxide is similar under supercritical conditions.

With respect to various applications of supercritical gas extraction, Zhuze applied dense-gas solvent extraction to the deasphalting of petroleum fractions using a propane-propylene gas mixture [Vestnik Akad. Nauk S.S.S.R., 29 (11), 47–52 (1959)]. Other chemical engineering applications which employ supercritical gas phase extraction are described in U.S. Pat. Nos. 2,665,238; 3,051,644; 3,453,206; 3,501,396; 3,586,621; 3,676,331; 3,733,259; 3,850,738; 3,880,945; 3,948,755; and 4,108,760; and in British Pat. Nos. 1,057,911 and 1,111,422.

Since dense-gas solvent extraction is depended mainly on physical rather than chemical properties, a wide variety of normally gaseous and liquid organic media are suitable for the technique. The critical temperature and critical pressure data of various organic gases and liquids are listed in Angew. Chem. Int. Ed. Engl., 17, 738–746 (1978). The list includes carbon dioxide, ammonia, water, methanol, ethane, hexane, benzene, dichlorodifluoromethane, nitrous oxide, diethyl ether, and the like.

An extensive disclosure of organic gases and liquids suitable for application as supercritical fluids in dense-gas extraction is set forth in U.S. Pat. No. 4,108,760 with respect to the recovery of organic matter from oil shales and tar sands. The disclosure includes aliphatics, aromatics, alkanes, alkenes, heterocycles, halocarbons, and the like, and lists specific compounds such as sulfur dioxide, carbon disulfide, tetrahydrofuran, acetone, pyridine and methylene chloride.

For a typical solvent medium such as pentane, the critical temperature of the solvent is between about 300°–700° F. The step(1) conversion zone normally is maintained at a temperature which is between about 50°–500° F. above the critical temperature of the particular dense-gas solvent phase being employed.

One of the unique advantages of the present invention process is the fact that the product of the process (i.e., refined hydrocarbon crackate) contains constituents which under supercritical conditions function as a dense-gas solvent extract phase. For example, light end hydrocarbons which are produced by the cracking of the heavy hydrocarbon oil can be separated from the refined hydrocarbon crackate product mixture recovered in step(3) and recycled to step(1) of the process. Hence, hydrocarbon crackage or a portion thereof or an equivalent mixture can be employed as the solvent component in the step(1) conversion zone, either alone or in admixture with another dense-gas phase solvent such as carbon dioxide.

The reaction conditions in step(1) are selected so as to achieve a balance between the optimum parameters for demetalation-desulfurization-denitrification-cracking of the heavy hydrocarbon oil feedstock and the optimum parameters for dense-gas phase extraction.

In a typical run, the feedstock conversion in step(1) is conducted at a temperature in the range between about 775°–1000° F. under autogenous pressure. As a further embodiment of the invention process, the feedstock conversion in step(1) is conducted in the presence of a hydrogen partial pressure of about 100–4000 psi.

The pressure in the step(1) conversion zone preferably is maintained at or above the critical pressure of the dense-gas solvent phase. Depending on the particular dense-gas solvent being employed, the pressure normally will vary in the range between about 500–10,000 psi.

The conditions of temperature and pressure in the step(1) conversion zone are such that the dense-gas solvent phase is in a supercritical fluid state, i.e., it is a fluid which can be densified but not liquefied by high pressure. As noted previously, the temperature and pressure are balanced so as to effect both the conversion of heavy feedstock and the desired selective extraction of the crackate constituents which are produced.

The invention process can be practiced either as a batch or continuous mode of operation.

In the case of a continuous operation, the liquid hourly space velocity of the heavy hydrocarbon feedstock will vary in the range between about 0.1–10, and on the average will be in the range between about 2–5. In a typical run, the residence time of the feedstock in the step(1) conversion zone will vary between about 20 minutes and two hours.

When hydrogen is included as a component in the conversion system, a suitable hydrogen feed rate will vary between about 1000–5000 SCF of hydrogen per barrel of heavy hydrocarbon oil feedstock.

As previously described, the dense-gas solvent extract phase is separated in step(2) and recovered in a form which is substantially free of metal halide catalyst particles.

The suspension of metal halide catalyst remains in the heavy hydrocarbon oil liquid phase during the step(1) conversion reaction. It is an important advantage of the invention process that refined hydrocarbon crackate product is recovered without the need for a catalyst separation step. This minimizes catalyst loss and extends the life of the catalyst.

The dense-gas solvent extract phase is withdrawn from the upper section of the step(1) conversion zone, and transferred to a separation zone, in which zone the dense-gas solvent is recovered and recycled to the step(1) conversion zone.

The discharge of the solute from the dense-gas solvent extract phase is accomplished by the expediency of lowering the pressure in the separation zone down to about 100–500 psi, while maintaining the temperature above the critical temperature of dense-gas solvent.

Optionally, a distillation column is employed to fractionate the hydrocarbon solute which has been discharged from the dense-gas solvent. After removal of light ends, a distillate fraction having a boiling range between about 100°–950° F. is recovered.

During the recycle of the dense-gas solvent to the step(1) conversion zone, it is highly advantageous to include a heat exchanger in the train to liquefy the said dense-gas solvent phase. This is accomplished by lowering the temperature of the dense-gas solvent phase to below its critical temperature. When the recycle solvent is in liquid form, it can be easily and economically repressured and then reheated to supercritical levels of pressure and temperature.

With respect to the residual asphaltic phase, it is recovered from the lower section of the step(1) conversion zone. It constitutes an excellent chargestock material for a coking or gasification operation. A gasification cycle is advantageous in conjunction with the invention process since it can provide a hydrogen supply when the process is conducted in a hydroconversion mode of operation.

The metal halide catalyst is separated from the residual asphaltic phase by conventional means such as by settling or by the use of liquid-solid cyclones. In a continuous operation, a stream of residual asphaltic phase containing suspended catalyst particles is withdrawn continuously from the conversion zone, and the catalyst is recovered and recycled to the conversion zone. Since in most cases the metal halide catalyst has been at least partially converted to a sulfide and/or oxide, preferably the recovered catalyst is regenerated prior to recycle to the conversion zone. For purposes of catalysis, the presence of halide atoms is essential.

Under optimal conditions, the hydrocarbon crackate fraction produced by the invention process is characterized by a metals content removal of at least 90 percent, a sulfur content removal of at least 80 percent, a nitrogen content removal of at least 70 percent and a Conradson Carbon Residue content reduction of at least 70 percent, in comparison with the corresponding contents, respectively, in the heavy hydrocarbon oil feedstock.

As further illustration of the invention process, the drawing is a schematic representation of an integrated multi-unit system for conversion of a heavy hydrocarbon oil to a refined hydrocarbon crackate product.

Referring to the drawing, a heavy hydrocarbon feedstock is passed through line 11 and admixed with dense-gas pentane solvent which is fed through line 12, and the admixture is charged to Hydroconversion unit 10.

The feedstock is an Arabian light vacuum residual oil having the following nominal analysis:

| | | |
|---|---|---|
| | °API, gravity | 8.3 |
| | H, wt % | 10.67 |
| | S, wt % | 3.93 |
| | N, wt % | 0.28 |
| | CCR, wt % | 16.13 |
| | V, ppm | 68 |
| | Ni, ppm | 17 |
| | MW | 810 |

Concurrently, hydrogen is supplied to Hydroconversion unit 10 through line 13, and particulate cuprous chloride catalyst is charged via line 14.

The weight ratio of solvent to heavy hydrocarbon feedstock is about 4:1. The liquid hourly space velocity of the feedstock is 2 (volume oil/volume of Hydroconversion unit 10/hour). The weight ratio of feedstock to catalyst is about 10. The residence time of the feedstock is about 30 minutes.

Hydroconversion unit 10 is operated under supercritical conditions with respect to the dense-gas pentane solvent, i.e., an average temperature of 775° F. and an average pressure of 3000 psi.

The partial pressure of hydrogen is maintained in a range between about 1500–3000 psi. The supply rate of hydrogen is about 1000–2000 SCF per barrel of hydrocarbon oil feedstock.

The volume of oil/solvent/catalyst mixture occupies the lower section of the hydroconversion reactor, and dense-gas pentane occupies the upper section of the hydroconversion reactor. The liquid volume in the lower section is subjected to rapid stirring to maintain the particulate cuprous chloride catalyst in suspension. A dense-gas pentane solvent extract phase is withdrawn continuously from the upper section of Hydroconversion unit 10 via line 16 and transferred to Solvent Separation unit 20. A residual asphaltic phase containing suspended cuprous chloride is withdrawn continuously from the lower section of Hydroconversion unit 10 through line 17 and passed into Catalyst Separation unit 35 (e.g., a cyclone unit).

In Solvent Separation unit 20, substantially all of the hydrocarbon solute in the dense-gas pentane extract phase is discharged and forms a separate liquid phase. The discharge of solute is accomplished by depressurizing the system to about 200 psi at a temperature of about 400° F. The newly formed liquid phase (i.e., refined hydrocrackate product) is withdrawn via line 21 and reserved for further processing steps not shown in the drawing. For example, the said refined hydrocrackate product contains a substantial proportion of 500°–950° F. boiling range material which is an excellent chargestock for an FCC unit.

The dense-gas pentant solvent (and hydrogen) stream which is recovered from Solvent Separation unit 20 is transferred to Solvent Cooling unit 25 by means of line 22. Hydrogen is recovered from Solvent Cooling unit 25 through line 26, and after a scrubbing treatment with aqueous sodium hydroxide is recycled to Hydroconversion unit 10.

In Solvent Cooling unit 25, the pentane solvent is liquefied at a temperature below about 100° F., and the liquid pentane is pumped via line 27 to Heat Exchanger 30. The liquid pentane is repressurized and reheated up to supercritical levels and recycled through line 31 to Hydroconversion unit 10.

In Catalyst Separation unit 35, recovered cuprous chloride catalyst is recycled through line 36 to Hydroconversion unit 10. At least a portion of the recovered cuprous chloride is diverted to Catalyst Regeneration zone 40 via line 37, for the purpose of reconverting cuprous oxide and cuprous sulfide to cuprous chloride. The regenerated cuprous chloride is returned to the main process train via line 41.

A catalyst-free residual asphaltic phase is recovered from Catalyst Separation unit 35 through line 38 and is reserved for further conversion by gasification or coking.

Thus, the present invention process is adapted to convert a heavy hydrocarbon oil to a refined hydrocarbon crackate product, in which process the crackate product is recovered free of cracking catalyst content, wherein the main bulk of the cracking catalyst remains in the cracking zone during the process run.

What is claimed is:

1. A process for conversion of a heavy hydrocarbon oil which comprises (1) contacting a heavy hydrocarbon oil with a metal halide catalyst in admixture with a solvent component under supercritical conditions to form a dense-gas solvent extract phase and a residual asphaltic phase; (2) separating the phases to provide a dense-gas solvent extract phase which is substantially free of metal halide catalyst content; and (3) fractionating the dense-gas solvent extract phase to remove the solvent and yield a refined hydrocarbon crackate fraction.

2. A process in accordance with claim 1 wherein the heavy hydrocarbon oil in step(1) is a crude oil distillation residuum.

3. A process in accordance with claim 1 wherein the solvent in step(1) exhibits a dense-gas critical temperature in the range between about 300°–700° F.

4. A process in accordance with claim 1 wherein the weight ratio of said solvent to heavy hydrocarbon oil feedstock in step(1) is in the range between about 1–10:1.

5. A process in accordance with claim 1 wherein the solvent in step(1) comprises an aliphatic compound.

6. A process in accordance with claim 1 wherein the solvent in step(1) comprises an aromatic compound.

7. A process in accordance with claim 1 wherein the solvent in step(1) comprises carbon dioxide.

8. A process in accordance with claim 1 wherein the solvent in step(1) comprises sulfur dioxide.

9. A process in accordance with claim 1 wherein the solvent in step(1) comprises carbon disulfide.

10. A process in accordance with claim 1 wherein the solvent in step(1) comprises tetrahydrofuran.

11. A process in accordance with claim 1 wherein the solvent in step(1) comprises acetone.

12. A process in accordance with claim 1 wherein the solvent in step(1) comprises pyridine.

13. A process in accordance with claim 1 wherein the solvent in step(1) comprises methylene chloride.

14. A process in accordance with claim 1 wherein the solvent in step(1) comprises hydrocarbon crackate which is recycled from step(3).

15. A process in accordance with claim 1 wherein the metal halide catalyst in step(1) is present in a quantity between 0.5–30 weight percent based on the weight of heavy hydrocarbon oil feedstock.

16. A process in accordance with claim 1 wherein the metal halide catalyst in step(1) is metal chloride.

17. A process in accordance with claim 1 wherein the metal halide catalyst in step(1) is copper chloride.

18. A process in accordance with claim 1 wherein the metal halide catalyst in step(1) is zinc chloride.

19. A process in accordance with claim 1 wherein the metal halide catalyst in step(1) is aluminum chloride.

20. A process in accordance with claim 1 wherein the conversion in step(1) is conducted at a temperature in the range between about 775°–1000° F. under autogenous pressure.

21. A process in accordance with claim 1 wherein the conversion in step(1) is conducted in the presence of a hydrogen partial pressure of about 100–4000 psi.

22. A process in accordance with claim 1 wherein the refined hydrocarbon crackate fraction recovered in step(3) has a boiling range between about 100°–950° F.

23. A process in accordance with claim 1 wherein the refined hydrocarbon crackate fraction recovered in step(3) has a metals content reduction of at least 90 percent in comparison with the metals content of the heavy hydrocarbon oil feedstock.

24. A process in accordance with claim 1 wherein the refined hydrocarbon crackate fraction recovered in step(3) has a sulfur content reduction of at least 80 percent in comparison with the sulfur content of the heavy hydrocarbon oil feedstock.

25. A process in accordance with claim 1 wherein the refined hydrocarbon crackate fraction recovered in step(3) has a nitrogen content reduction of at least 70 percent in comparison with the nitrogen content of the heavy hydrocarbon oil feedstock.

26. A process in accordance with claim 1 wherein the refined hydrocarbon crackate fraction recovered in step(3) has a Conradson Carbon Residue content reduction of at least 70 percent in comparison with the Conradson Carbon Residue content of the heavy hydrocarbon oil feedstock.

27. A process in accordance with claim 1 wherein the solvent recovered in step(3) is condensed and recycled in liquid form.

28. A process for conversion of a heavy hydrocarbon oil which comprises (1) contacting a heavy hydrocarbon oil with a metal halide catalyst in admixture with an in situ-formed solvent component under supercritical conditions to provide a dense-gas solvent extract phase and a residual asphaltic phase; and (2) separating the phases to yield a dense-gas solvent extract phase which is substantially free of metal halide catalyst content.

* * * * *